United States Patent
Bearfield

(10) Patent No.: US 6,268,711 B1
(45) Date of Patent: Jul. 31, 2001

(54) BATTERY MANAGER

(75) Inventor: Jonathan Matthew Bearfield, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/565,271

(22) Filed: May 5, 2000

Related U.S. Application Data

(60) Provisional application No. 60/132,536, filed on May 5, 1999.

(51) Int. Cl.[7] .................................................... H02J 7/00
(52) U.S. Cl. ............................................. 320/117; 320/116
(58) Field of Search .................................. 320/117, 116, 320/126; 307/64, 65, 66

(56) References Cited

U.S. PATENT DOCUMENTS 5,739,596  *  4/1998  Takizawa et al. ................... 320/128
5,969,505  * 10/1999  Okamuta ............................. 320/122

* cited by examiner

*Primary Examiner*—Peter S. Wong
*Assistant Examiner*—Lawrence Luk
(74) *Attorney, Agent, or Firm*—April M. Mosby; W. James Brady; Frederick J. Telecky, Jr.

(57) ABSTRACT

A battery manager that provides the ability to switch multiple batteries, battery cells, or other forms of power sources to power external devices individually, in series, and/or in parallel. The device is typically electronic based and consists of voltage level detecting circuits for comparing each power source to a reference voltage, FET control logic for controlling the switching matrix, and a switching matrix which accomplishes the required configuration of power sources to provide an output power source. The invention can be extended with the addition of an output power monitor, DC/DC converter, and control signals that augment internal switching. Depending upon implementation requirements, the battery manager can be in the form of a single integrated circuit.

7 Claims, 5 Drawing Sheets

| BATTERY 1 | BATTERY 2 | U1 OUT | U2 OUT | U3 OUT | U4 OUT | U5 OUT | U6 OUT | U7 OUT | Q1 | Q2 | Q3 | Q4 | BATTERY IN USE |
|---|---|---|---|---|---|---|---|---|---|---|---|---|---|
| > VREF | > VREF | 1 | 1 | 0 | 0 | 1 | 1 | 0 | ON | ON | OFF | OFF | BATTERY 1 |
| < VREF | > VREF | 0 | 1 | 1 | 0 | 0 | 1 | 1 | OFF | OFF | ON | OFF | BATTERY 2 |
| < VREF | < VREF | 0 | 0 | 0 | 1 | 1 | 0 | 1 | ON | OFF | OFF | ON | 1 AND 2 IN SERIES |
*FIG. 3*
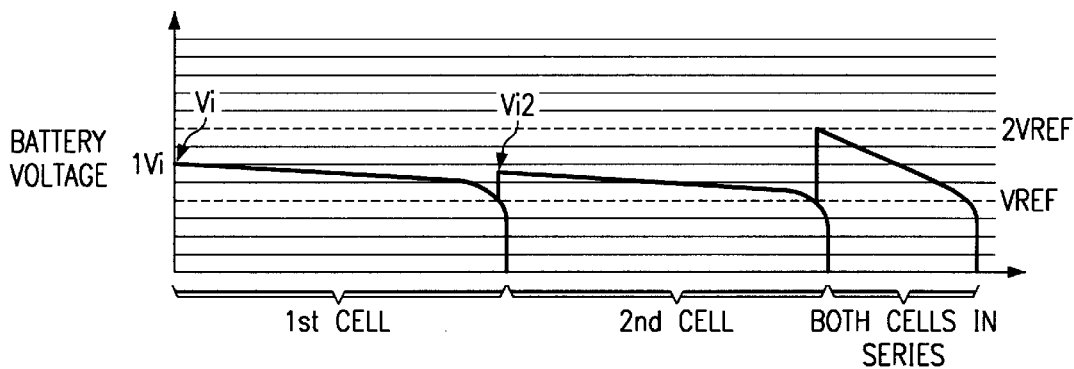
*FIG. 4*
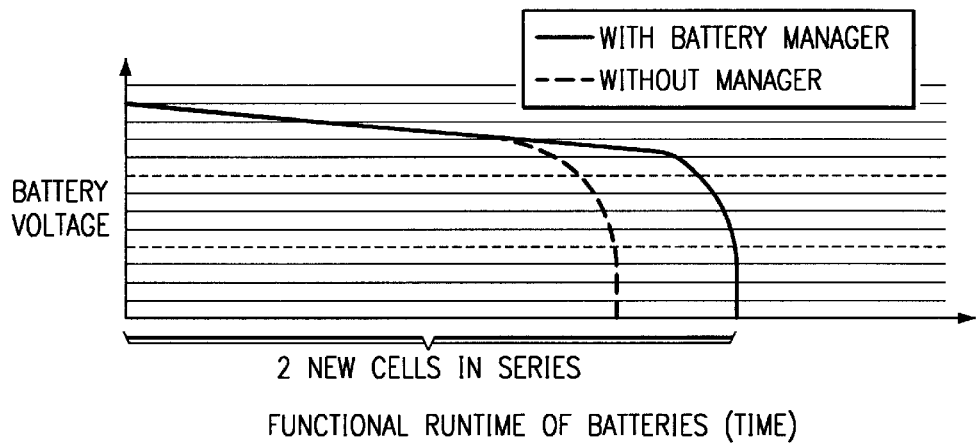
*FIG. 5*

| BATTERY 1 | BATTERY 2 | PARALLEL | U1 OUT | U2 OUT | U3 OUT | U4 OUT | U5 OUT | U6 OUT | U7 OUT | U8 OUT | U9 OUT | Q1 | Q2 | Q3 | Q4 | BATTERY IN USE |
|---|---|---|---|---|---|---|---|---|---|---|---|---|---|---|---|---|
| > VREF | > VREF | 1 | 1 | 1 | 0 | 0 | 0 | 1 | 0 | 1 | 0 | ON | ON | ON | OFF | B1, B2 PARALLEL |
| > VREF | > VREF | 0 | 1 | 1 | 0 | 0 | 0 | 1 | 0 | 0 | 1 | ON | ON | OFF | OFF | B1 |
| < VREF | > VREF | x | 0 | 1 | 1 | 0 | 1 | 1 | 1 | 0 | 0 | OFF | OFF | ON | OFF | B2 |
| < VREF | < VREF | x | 0 | 0 | 0 | 1 | 1 | 0 | 1 | 0 | 1 | ON | ON | OFF | ON | B1, B2 SERIES |

WHERE "x" = DON'T CARE AND PARALLEL = PARALLEL INPUT PIN

*FIG. 7*

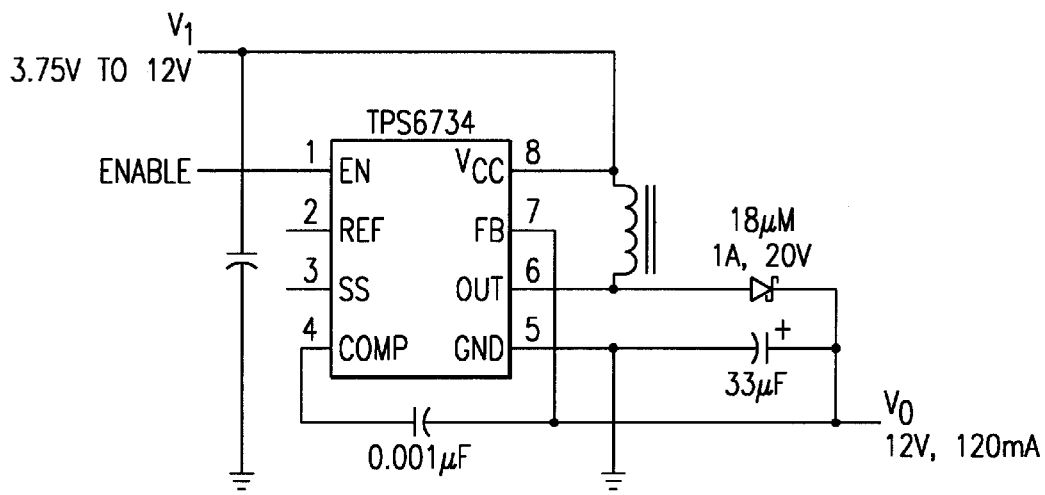

FIG. 8

| FUNCTION | OPTION FEATURE DESCRIPTION |
|---|---|
| DC/DC CONVERTER | BOOST OR BUCK CONVERTER FOR VOLTAGE LEVEL TRANSLATION. THE PIN REQUIREMENT IS BASED ON PERFORMANCE REQUIREMENTS. |
| PARALLEL | INTEGRATED OR EXTERNALLY CONTROLLED BATTERY PARALLEL SWITCHING FEATURE. |
| SINGLE/ SERIES | INTEGRATED OR EXTERNALLY CONTROLLED BATTERY SINGLE/SERIES SWITCHING FEATURE. |
| POWER MONITOR | MEANS FOR SWITCHING THE BATTERIES IN/OUT OF THE CIRCUIT BASED UPON THE STATUS OF EXTERNAL INTERFACES WITH THE DEVICE/CIRCUIT BEING POWERED. THE FUNCTION OF THE POWER MONITOR COULD BE ACTIVATED INTERNAL OR EXTERNAL TO THE BATTERY MANAGER. |
| DIGITAL VREF | DIGITAL PROGRAMMING OF AN INTERNAL VREF SETTING. NUMBER OF PINS BASED ON NUMBER OF BITS OF RESOLUTION OR DESIRED NUMBER OF STEPS. |

BATTERY MANAGER

This application claims priority under 35 USC §119(e)(1) of Provisional Application No. 60/132,536, filed May 5, 1999.

TECHNICAL FIELD OF THE INVENTION

This invention relates to a battery manager that provides for switching between batteries, battery cells, or other power sources and/or for switching them singly and/or series and/or parallel. This can be used to increase the runtime of electrical and electronic-based circuits being powered, to provide increased current drive, and/or to improve utilization of batteries in specialized applications.

BACKGROUND OF THE INVENTION

Presently, a battery management system is commonly provided for very complex electrical and electronic-based circuits or devices, such as laptop computers, which typically utilize rechargeable batteries. In these applications, the battery management system typically provides a specialized serial interface, such as the SMBus, for interfacing with an external controller such as a micro-controller. These battery management systems consist of specialized circuitry which is optimized for the unique chemistry of the specific battery type being monitored and controlled, i.e. nickel cadmium, lithium, etc. The battery management system and the associated microcontroller incorporate current or voltage level monitoring techniques to switch between battery sources and/or to shut down the device being powered at a battery discharge level that is controlled by data stored in memory. These battery management systems are of a greater complexity and cost than can be justified for less expensive devices.

SUMMARY OF THE INVENTION

This invention provides a simple (single/series/parallel) battery manager that can be utilized to monitor multiple battery power sources and to control the selection of the battery/power source(s). This is useful in extending the operational life of the device being powered or for enhancing the utilization of batteries in specialized applications. The single/serial/parallel battery manager performs required monitoring and switching functions without the need for microcontrollers, associated complex circuitry and programming unique to the battery chemistry, and/or the addition of specialized interfaces such as the SMBus. The invention relates to the electrical components, functionality, and interfaces required for managing the selection of the battery source(s) which provide power for the device, as well as control of the power source interfaces to the device. The invention provides for switching between individual battery sources for the extension of operating time of the system being powered through the incorporation of serial and/or parallel connection of batteries once the individual battery sources have degraded below a voltage or current threshold level. The invention also addresses the application of the simple single/series/parallel battery manager to improve utilization of batteries for specialized applications such as uninterruptible power systems (UPS) and control of electric motors.

Rechargeable or disposable power sources/batteries of any chemistry may be managed by this invention. These batteries may be utilized individually and in a series or parallel configuration to power the interfacing load device. Under initial operating circumstances, the battery manager selects one or multiple battery sources to power the interfacing device. Then, as the device's power requirements change and/or as the power capability of the battery/(ies) degrades, the battery manager switches from one power source configuration to another or to combinations of series or parallel, as required for the specific implementation.

Battery voltage level detector circuits (typically operational amplifiers (op amp)) monitor and compare the voltage level of the various batteries to a reference voltage ($V_{ref}$). When the voltage of one or more batteries has degraded below the level of Vref, the voltage level detector provides output(s) to the FET control logic. These signals are processed by the FET control logic, causing the battery selection FET switching matrix to switch batteries in and/or out as the power source. Batteries will be switched alone or in combinations as determined by specific device implementation requirements. For instance, this could result in the output voltage being initially provided by battery 1 until battery 1 degrades to the level of Vref, then provided by battery 2 until it degrades to Vref, and then by battery 1 and battery 2 in series.

The battery manager may be enhanced with the addition of output power monitor circuits and/or DC/DC Converter. The output power monitor provides the means to monitor the load of the device being powered and to "feed" this information back to the battery manager for use in switching batteries in/out of the circuit upon demand. The addition of a DC/DC converter on the output provides the means to extend the output voltage beyond the limitations of standard off-the-shelf battery based power sources.

The simple battery manager is typically implemented with standard logic elements for control of switching characteristics, differential op amps for comparing voltage levels, and FETs to accomplish the actual switched arrangements.

BRIEF DESCRIPTION OF THE DRAWINGS

A block diagram of the invention as well as example schematics and a timing diagram are provided.

FIG. 3 is the logic truth table for the example of FIG. 2.

FIG. 4 is a representative timing diagram for the example of FIG. 2.

FIG. 5 is a representative timing diagram showing two batteries in series with and without battery manager.

FIG. 7 is the logic truth table for the schematic of FIG. 6.

FIG. 8 is an example implementation of the optional DC/D,C converter.

FIG. 9 is a table summarizing the example options.

DETAILED DESCRIPTION OF THE INVENTION

Figure 1:
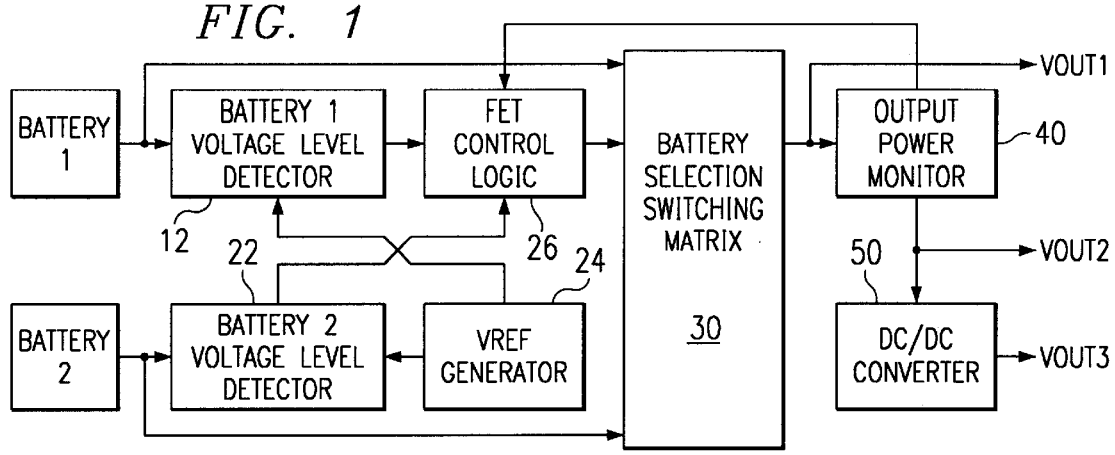
FIG. 1 is a block diagram of the series/parallel battery manager.

The implementation of the simple battery manager invention may include the ability to switch between independent battery systems (cells) as well as the ability to connect battery systems (cells) in series and/or in parallel, depending upon the need for extended voltage or current demands. The invention provides the advantage of extending the operating life of the device being powered without manually replacing the battery source. It also has the advantage of extending the life and value of devices which might be designed as "throw away" devices. The incorporation of the battery manager circuitry and additional battery (battery cells) increases the value of the "throw away" device when compared to a similar device which has to be 100% replaced when a single battery source fails.

This invention is also applicable when the battery load has a wide swing in voltage or current requirements at determinable periods in time. Electric motor and uninterruptible power source (UPS) applications are examples with these characteristics.

Electric motors, like those used in high performance racing motorcycles or any similar application, require a great deal of energy to initially charge the windings and start the motor turning, after which they require a more steady state operation with a less amount of energy. In this type of application, the simple battery manager can be used to initially place the batteries in parallel in order to increase the available current level. Once the motor reaches a certain number of revolutions per minute (RPM), the additional battery can be switched out of service and held in standby for peak current loads during the operational cycle of the equipment. (The switched battery might have lower or higher power requirements than the steady state battery source.)

The application for a UPS battery management system is quite similar to that of the electric motor application since the current demand for the UPS is high when the UPS is first activated. Once the UPS has stabilized and compensated for the drop in the power line, it can power a particular load for a specified period of time. This invention provides a simple and inexpensive means for managing batteries associated with a UPS so that greater current capability is provided during the initial power transient period when the UPS is activated, with increased amp-hours being available after the transient period is over. This is accomplished by switching batteries in parallel during power-on transient period and in series or stand-by for "normal" operation.

The simple battery manager concept can also be utilized to address the inherent problem with designs utilizing multiple batteries which is caused by the fact that batteries do not source power equally. For example, each battery in a multiple battery powered device will discharge at a different rate. When the first battery is discharged in these cases, the remaining battery(ies) is(are) either blocked from delivering power and/or it (they) spend a percentage of its (their) power trying to charge the first battery. A typical example of this discharge disparity is provided by battery power consumption in a flashlight.

Whether multiple batteries are used in flashlights, watches, personal organizers, or games, it is rare for all of the batteries in the device to be fully discharged when the equipment has quit working. Typically, all of the batteries are removed and recharged or disposed of at the same time or the device is thrown away, even though some of the batteries may still have a great deal of energy to deliver. In such multiple battery power systems, the order of the batteries can very often be manually rearranged to continue powering the flashlight after the first battery sequence has ceased to work. The simple battery manager provides the means for automating this battery sequence transition so that the available operation time of simpler electronics could be increased, extending the useful period of time that disposable or rechargeable batteries could be operated in any given device. This invention provides a cost-effective means for extending the operational life of these battery systems, thus extending the life and value of these devices.

FIG. 1 provides a simplified block diagram of the preferred embodiment of the series/parallel battery manager.

Battery 1 (block B1) and battery 2 (block B2) are rechargeable or disposable power sources of any chemistry. These batteries may be utilized individually and in a series or parallel configuration to power the interfacing device. Under initial operating circumstances, the battery manager selects one or both of these sources to power the interfacing device at pins VOUT1, VOUT2, or VOUT3, depending upon the particular implementation scheme. Then, as the device's power requirements change and/or as the power capability of the battery degrades, the battery manager switches from one power source configuration to another or to both in series or parallel, as required for the specific implementation.

The battery 1 voltage level detector circuit 12 monitors and compares the voltage level of battery 1 with the output of the Vref generator circuit 24. Circuit 12 is typically implemented with an operational amplifier (op amp) type device which compares the voltage level of battery 1 with a reference voltage ($V_{ref}$) that is supplied by the Vref generator circuit 24, described below. When circuit 12 detects that the voltage of battery 1 has degraded below the level of Vref, it provides an output with this indication to the FET control logic circuit 26. When circuit 26 detects that B1 is below Vref and B2 is above Vref, it causes the battery selection FET switching matrix circuit 30 to switch battery 1 out as the power source and battery 2 in as the power source.

Similarly, the battery 2 voltage level detector circuit 22 provides an output that indicates when the voltage level available from battery 2 is below the voltage reference level Vref. The output from 22 and the output from circuit 12 are then utilized by the FET control logic 26 and the battery selection FET switching matrix 30 to switch battery 1 and battery 2 in series or parallel for jointly powering the end device.

The Vref generator block 24 provides the reference voltage that is used by voltage level detectors 12 and 22 for comparison with the battery voltages. Various designs are available for creation of this reference voltage. For instance, the Vref generator circuit 24 can be a simple voltage divider system which utilizes inputs from battery 1 and/or battery 2 or another separate power source to generate the reference voltage at which switching is to occur. Or the Vref signal can be provided from a separate external power source. When a tighter tolerance is required, the Vref generator can be of a more complex design, including the use of a programmable digital interface for setting the switching threshold. The Vref level is typically selected as the minimum recommended operating voltage level required for the device being powered.

For an analog implementation, Vref can be simply generated by placing shunt or zener diodes on the Vref input pin to the voltage level detectors. By placing a large resistor between the diode/detector connection and the battery selection switching circuit 30, a constant reference voltage can be maintained at the detector inputs. In order to keep the voltage at the Vref input pin from dropping below the conduction voltage of the zener diode, a resistive voltage divider can be placed on the non-inverting input of the detector. This will require only a small percentage of the battery voltage for the detector, with the resistor values being selected or programmed to take circuit offsets into consideration.

FET control logic circuit 26 consists of standard logic elements such as AND, OR and NOR gates that interface with voltage level detector circuits 12 and 22 to provide logic levels for control of the switching FETs associated with the battery selection switching matrix circuit 30. Circuit 26 is designed to monitor the status of circuits 12 and 22 and to provide control of the FETs of the switching matrix as the voltage level changes. For a simple series implementation, a typical design would provide power with battery 1, switch to battery 2 when battery 1 is below Vref, and then switch to battery 1 and 2 in series when both are below Vref.

The battery selection switching matrix circuit 30 is implemented with N-channel or P-channel field effect transistors (FETs) which are used to switch the source of battery power. Circuit 30 utilizes the control signals from the FET control logic circuit 26 to switch batteries alone or in combinations as determined by specific device implementation requirements. For instance, this could result in the voltage at VOUT1 being initially provided by battery 1 until battery 1 degrades to the level of Vref, then provided by battery 2 until it degrades to Vref, and then by battery 1 and battery 2 in series.

VOUT1 is the switched output voltage from block 30 which can be utilized to power the external circuit/device and/or to provide a voltage input to the optional output power monitor and/or to the optional DC/DC converter for further conditioning.

The optional output power monitor block 40 provides the means for switching the batteries in/out of the circuit based upon the status of the external load. As shown, block 40 provides an output voltage indicated as VOUT2 which is available for providing power to the circuit/device and/or as an input to the optional DC/DC converter block 50, as well as for switching the batteries. For example, the power monitor circuit can be designed to monitor the current demand of the circuit/device being powered and to use this information to provide a signal to the battery selection switching matrix for switching the batteries as load requirements change. The power output monitor option also provides the ability to add features such as current limiting and over/under voltage protection. Two simple methods of monitoring the output power demand are voltage mode and current mode. In current mode, a portion of the current being pulled through the power monitor for power the end device is fed back into the circuit. Thresholds can then be set within the power monitor to detect when the current load goes above a certain level. Voltage mode is a second possibility; in this case, the power monitor can be designed with a voltage divider which, in effect, monitors the current demand of the device being powered. In this case, the voltage level of the voltage divider is fed back into the power monitor and if the voltage drops below a certain threshold the power monitor will generate necessary signals for control of the battery switching matrix. Depending upon the type of feature being implemented, this block will also have other interfaces, with the number and function being determined by the specific implementation. For instance, multiple current loads could be monitored with the addition of more interfaces with the driven device. The power monitor option does not require the presence of the DC/DC converter option that is described below.

The optional DC/DC converter block 50 can be integrated with the simple battery manager to provide the means for efficiently increasing or decreasing the voltage level supplied to the circuit/device which is the load. This option provides a compact and simple variation of the invention that satisfies voltage requirements of a large percentage of applications that require a different voltage than can be directly supplied by available off-the-shelf batteries. The input and output voltage requirements of the DC/DC converter are application specific. The DC/DC converter can interface directly with the output of the battery manager Vout1 or the optional power monitor output Vout2, as required by the specific application. In addition, portions of the circuit/device being powered can also utilize VOUT1 and/or VOUT2, as required by the specific application. A more detailed discussion of the DC/DC converter follows the descriptions of the example schematics of two simple battery managers.

As shown, the block diagram of FIG. 1 and subsequent examples are based on the presence and switching of two batteries. However, the invention provides the option of adding additional batteries and associated circuitry, with no limit on the number of batteries/cells or the switching combination of the batteries.

Figure 2:
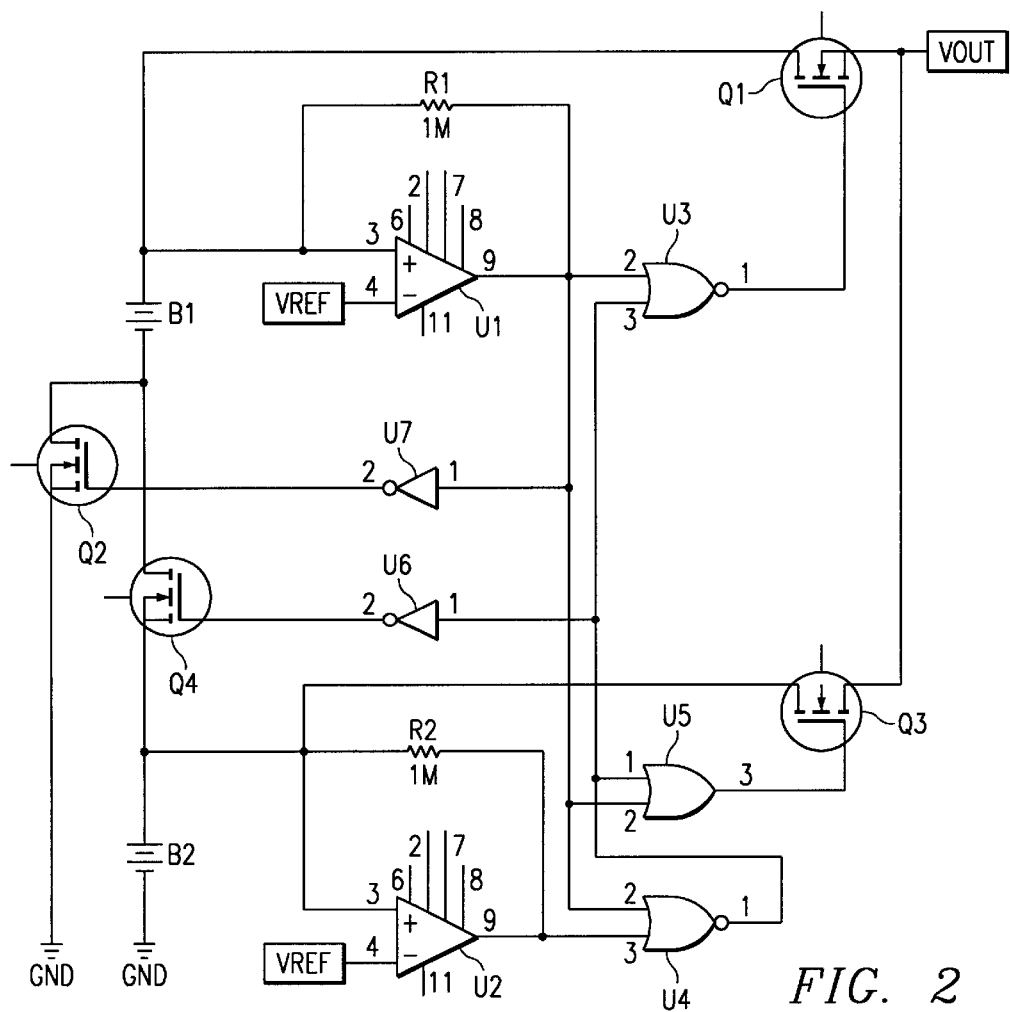
FIG. 2 provides a schematic for an example single/series battery manager.

FIG. 2 and FIG. 3 provide a schematic and the associated truth table for one possible implementation of the invention. This implementation illustrates a simple series battery manager that monitors the status of two separate battery/cell power sources that are switched singly and in series to provide power for an external device/circuit. As shown, the battery manager consists of voltage monitoring circuitry for each battery source and switching circuitry that controls which battery source provides power to the interfacing device. Means is provided for powering the device from each battery, as well as connecting the batteries in series to further extend the operational life of the batteries and the circuit being powered.

The battery manager circuits can consist of electronic devices such as discrete transistors, field effect transistors (FETs), and/or integrated circuits plus resistors, capacitors, inductors, and/or diodes, as required. The battery manager is designed so that battery 1 (B1) initially provides power to the device/circuit through FET Q1, with Q2 providing the ground reference for B1. Battery B1 remains the power source until the battery B1 voltage level detector circuit determines that the voltage output supplied by B1 has degraded below the designed threshold level of Vref, enabling the selection of Battery 2 (B2) as the primary power source. At this time, Q3 provides the path for B2 to supply power to VOUT1.

As shown by the schematic, B1 and B2 are connected to operational amplifiers (op amps) U1 and U2, respectively, for monitoring purposes. These op amps and their associated resistors provide the battery voltage level detector function of circuits 12 and 22 as shown in the block diagram of FIG. 1.

For simplicity, Vref, which provides the reference level at which the batteries are to be switched, is shown as being supplied by a circuit that is external to the input pin labeled Vref.

As shown by the truth table, the outputs of the op amps will remain high until the voltage level from B1 or B2 degrades below the reference voltage level of Vref. (The outputs of U1 and U2 go low when the input at the positive (+) pin goes below Vref at the negative (−) pin.) The low level output from the op amp is used by the FET control logic to provide switching signals for the appropriate FETs.

NOR gates U3 and U4, OR gate U5, and inverters U6 and U7 are the logic devices which provide the FET control logic function of block 26. The FET battery selection switch matrix function is accomplished by FETs Q1 through Q4.

In this preferred embodiment of the invention, FETs Q1–Q4 are of a type of FET that does not have a parasitic back-gate diode, a feature often found in metal oxide semiconductor FETs (MOSFETs). As can be seen from the example schematics and discussion, the FETs incorporated in the preferred embodiment must be capable of supporting a higher voltage on the output side of the FET than on the input side, without conducting current back through the device. The invention, as set forth in the claims, is not intended to be limited to this type of device for accomplishing the features represented.

When power is first applied, both B1 and B2 are above Vref and the outputs of U1 and U2 are high. The output of U1 is connected to inverter U7. When the output of U1 is high, the output of U7 goes low causing Q2 to switch on, which provides a ground path for B1. The high output of U1 is also connected to U3, causing the output of U3 to be low which switches Q1 on, connecting the positive side of B1 to VOUT. Thus, B1 is supplying power to the external device through FET Q1, Q2, and pin VOUT.

When the voltage of B1 degrades below Vref, the output of U1 goes low. This causes the output of U7 to go high which turns Q2 off, removing the ground from B1. At the same time, the output of U3 goes high since both of its inputs are now low. This causes Q1 to switch off, removing B1 from the path to VOUT.

Similarly, when U1 goes low both inputs to U5 are low causing the output of U5 to go high. This causes FET Q3 to switch on, connecting B2 to VOUT.

After another period of time has elapsed, the voltage of B2 will degrade below Vref causing the output of U2 to go low. Since both inputs to U4 are now low, the output of U4 goes high causing the outputs of U3 and U6 to go low and U5 to go high. U3 going low turns on Q1, connecting the positive side of B1 to VOUT. U5 going low causes Q3 to switch off, disconnecting the positive side of B2 from VOUT. At the same time, the low output from U6 causes Q4 to switch on. When Q4 is on, the positive side of B2 is connected through Q4 to the negative side of B1. Thus, B1 and B2 are connected in series to provide the voltage output for VOUT through FETs Q1 and Q4. The inclusion of circuitry to provide external alarms (audible, visual, electronic, mechanical) to alert maintenance personnel for the need to replace one or both battery systems is straightforward and within the contemplation of this invention.

FIG. 4 provides a voltage versus timing diagram for two battery sources under the control of a simple series battery manager. In this case, V represents the voltage supplied to the device being powered by the batteries through the battery manager. V1 represents the initial, full voltage capability of each battery source B1 and B2; Vi2 represents the degraded voltage of B2 when B1 is below Vref; and Vref represents the threshold level at which battery switching is to occur. As shown, battery B1 provides the source for V until voltage B1 degrades to Vref. At this time ($t_1$), battery B2 is switched in as the voltage source. (Due to the passage of time, battery B2's maximum available voltage has degraded to Vi2 which is above the value of Vref since B2 has had a minimum load during this time.) As shown by the timing diagram, battery B2 continues to provide power for the device until its voltage level has degraded below Vref. At this time ($t_2$), batteries B1 & B2 are connected in series to provide power to the device. Thus, the operating time of the device has been extended beyond that of a single battery or a pair of batteries which are simply treated as redundant power sources. In a typical implementation, the in-series batteries will initially operate at a level below 2Vref that will be designed to be within the maximum voltage operating range of the device.

FIG. 5 timing diagram illustrates the voltage level and operating life of two batteries which are connected in series to provide power for a load similar to the example of FIG. 2 versus the increase of available operating time when the same batteries are switched per the invention. The series-only operation is representative of present designs without the battery manager in which additional batteries are added in series as a method of extending operating time. As can be seen, these series-only batteries provide power for a shorter time than can be achieved with the same batteries being switched singly and then in series.

In a similar manner, the battery monitoring circuits can be designed to monitor current levels with the batteries being switched in/out of a parallel configuration as designed current threshold levels are reached. Variations of this implementation include switching different numbers (two or more) of batteries in parallel as determined by the current demand, as well as using parallel switching in conjunction with single/series switching.

Figure 6:
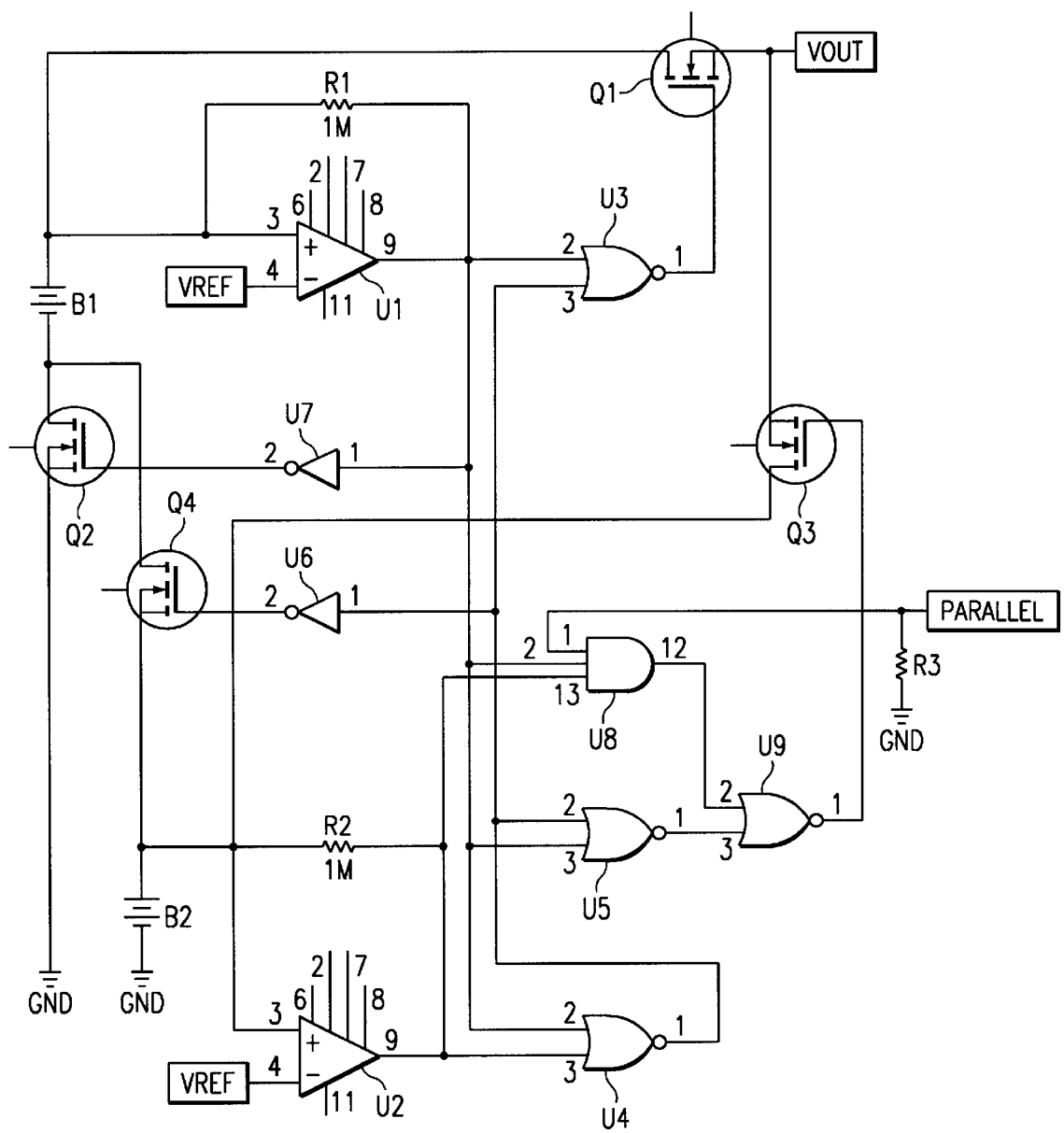
FIG. 6 is a schematic representation of an example single/series/parallel battery manager.

FIG. 6 and the associated truth table of FIG. 7 provide one possible implementation of a simple battery manager that provides parallel plus single/series battery switching capability.

The schematic of FIG. 6 is similar to the example of FIG. 2 with the addition of parallel switching. For this example, an input pin (PARALLEL) and associated components have been added for switching the batteries in parallel when the circuit being powered has an increased demand for current with both batteries being above Vref.

For clarity purposes, components that perform functions of the schematic of FIG. 2 are labeled the same. The control of Q3 has been replaced with new switching logic. The monitor and control switching of B1 and Q1 remain as previously described. Thus, B1 will be in the circuit when B1 is above the Vref level or when B2 is below Vref.

A new input is labeled as the PARALLEL pin and its pull-down resistor is designated as R3. In order to switch B2 in parallel with B1, U5 has been changed to a NOR gate which interfaces with AND gate U8 and NOR gate U9 for the control of Q3. The circuit is designed so that Q3 will be on, connecting B2 to VOUT whenever PARALLEL is high with B1 and B2 being above the Vref level or whenever B1 is below Vref with B2 being above Vref.

As shown, the output of U8 will be high when PARALLEL and the outputs of U1 and U2 are high (B1 and B2 above Vref), causing the output of U9 to be low which turns Q3 on, connecting B2 to VOUT. At the same time, B1 is already connected to Vout through Q1 and Q2, as previously described. Thus, B1 and B2 are connected in parallel to provide increased current as requested by the condition of the PARALLEL input.

When B1 is below Vref, the output of U8 will always be low, inhibiting PARALLEL from controlling the status of Q3. When B1 is below Vref and B2 is above Vref, the output of U5 will be high, causing U9 to go low which turns Q3 on and connects B2 to VOUT. Thus, for this condition, only B2 supplies power at Vout. When both batteries are below Vref, Q3 will be off since both inputs to U9 will be high under these conditions. During this time, B1 and B2 are connected in series as previously described.

The design for control of PARALLEL could be implemented with an internal current sensing circuit that monitors the current demand(s) of the load and switches batteries in parallel when certain peak currents are seen. The capability provided by this current sensing circuit is consistent with the power monitor block in FIG. 1.

As discussed, several options and variations of the simple battery manager are possible. Illustrations have been discussed in some detail for a single/series implementation, a parallel implementation, optional power monitor, optional DC/DC converter, and an example with single/series/parallel switching. There are several possible variations of these options including ones in which batteries are switched in/out of the parallel configuration strictly as determined by current load demands with no series switching being implemented or with various batteries being switched singly at different Vref levels, with no series switching.

It is also possible to have other series variations, including the provision of external control(s) for activation of series switching. This might have several uses. One application might be to have a designated battery source supplying power until the external control is activated. At this time, the simple battery manager circuits that monitor and control switching between batteries and placement of batteries in series would be enabled. The characteristic of the external control would be application specific; this is also true of the particular implementation of the series battery manager function.

As previously discussed, there are also many possible variations for generation of the reference voltage (Vref) which is utilized as the battery switching reference. These implementations can be internal or external for a specific battery manager. The provided example was for a straight forward voltage divider with only one reference voltage being utilized to determine when switching occurred. However, more sophisticated options are available including the ability to switch more than two batteries in various combinations of singly, series, and/or parallel as determined by discrete digital inputs which represent incremental voltage changes. For instance, it is anticipated that Vref might be digitally generated and/or varied. For instance, a Vref circuit associated with the battery manager might have a multi-pin interface with an external device that is under fixed and/or programming control. The Vref signal could then be varied as needed to adapt to the operational requirements of the circuit being powered.)

The previously described power monitor option can be implemented as a self-contained element of the simple battery manager or it can be designed with an externally controlled enabling interface.

FIG. 8 provides an example of one of the numerous designs that are available for DC/DC converters. As shown, this implementation uses an integrated component manufactured by Texas Instruments. The TPS6734 DC/DC converter combined with the external capacitors, zener diode, and inductor is configured to accept an input voltage Vi with variations from 3.75 VDC to 12 VDC. When ENABLE is high, the output voltage Vo will be maintained at a constant voltage level of 12 VDC and up to 120 mA drive current. Thus, the incorporation of this design will ensure that the voltage output of the battery manager is further enhanced and the voltage variation range extended as various batteries are switched to serve as the primary power source.

FIG. 9 briefly summarizes the described options. These are just examples and not meant to be all inclusive.

I claim:
1. A battery manager comprising:
A. a reference voltage source providing a reference voltage on a reference voltage lead;
B. a plurality of battery voltage level detectors each connected to at least one connector for a storage battery and each connected to the reference voltage lead, each battery voltage level detector providing a detector output signal on a detector output lead, wherein the battery voltage level detectors are each operational amplifier that provide the detector output signal when a battery voltage on the connector for the storage battery falls below the reference voltage;
C. a plurality of switching control circuits having inputs connected to the detector output leads of all the batter level detectors and providing switching output signals on switching output leads, wherein the switching control circuits include logic gates; and
D. a plurality of switching circuits having control inputs connected to the switching output leads, having power inputs connected to individual ones of the connectors for the storage batteries and having output leads providing a supply power output of the battery manager circuit, the switching circuits being arranged selectively to connect the connectors for the storage batteries in series and in parallel.
2. A battery manager comprising:
A. a reference voltage source providing a reference voltage on a reference voltage lead;
B. a plurality of battery voltage level detectors each connected to at least one connector for a storage battery and each connected to the reference voltage lead, each battery voltage level detector providing a detector output signal on a detector output lead;
C. a plurality of switching control circuits having inputs connected to the detector output leads of all the batter level detectors and providing switching output signals on switching output leads; and
D. a plurality of switching circuits having control inputs connected to the switching output leads, having power inputs connected to individual ones of the connectors for the storage batteries and having output leads providing a supply power output of the battery manager circuit, the switching circuits being arranged selectively to connect the connectors for the storage batteries in series and in parallel;
wherein there is one and another connectors for a first storage battery and one and another connectors for a second storage battery and the switching circuits include a first transistor connected between the one connector for the first storage battery and the power output, a second transistor connected between the one connector for the second storage battery and the power output, a third transistor connected between the other connector for the first storage battery and the one connector for the second storage battery and a fourth transistor connected between the other connectors for the first and second storage batteries.
3. A battery manager comprising:
A. a reference voltage source providing a reference voltage on a reference voltage lead;
B. a plurality of battery voltage level detectors each connected to at least one connector for a storage battery and each connected to the reference voltage lead, each battery voltage level detector providing a detector output signal on a detector output lead;
C. a plurality of switching control circuits having inputs connected to the detector output leads of all the batter level detectors and providing switching output signals on switching output leads; and

D. a plurality switching circuits having control inputs connected to the switching output leads, having power inputs connected to individual ones of the connectors for the storage batteries and having output leads providing a supply power output of the battery manager circuit, the switching circuits being arranged selectively to connect the connectors for the storage batteries in series and in parallel, wherein the switching circuits include a parallel control input lead that causes the switching circuits to connect the connectors for the storage batteries in parallel.

4. A, process of selectively connecting plural storage batteries to a power output lead supplying electrical power to an external device comprising;

A. switching a first storage battery into connection with the power output lead to provide electrical power to the external device;

B. sensing the ability of the first storage battery to supply electrical power to the external device;

C. switching at least a second storage battery into a parallel connection with the first storage battery to the power output lead to supply sufficient electrical power to the external device when the first battery is unable to supply sufficient electrical power to the external device;

D. sensing the ability of the first and second storage batteries to supply electrical power to the external device; and E. switching at least one of the first and second storage batteries out of parallel connection to the power output lead while the other of the first and second storage batteries maintains supplying sufficient electrical power to the external device.

5. The process of claim 4 including switching at least a second storage battery into a parallel connection with the first storage battery at an initial application of electrical power to the external device.

6. A process of selectively connecting plural storage batteries to a power output lead supplying electrical power to an external device comprising;

A. switching a first storage battery into connection with the power output lead to provide electrical power to the external device;

B. sensing the ability of the first storage battery to supply electrical power to the external device;

C. switching a second storage battery into connection with the power output lead and disconnecting the first storage battery from connection with the power output lead to supply sufficient electrical power to the external device when the first battery is unable to supply sufficient electrical power to the external device;

D. sensing the ability of the second storage, battery to supply electrical power to the external device; and E. switching the first and second storage batteries into series connection to the power output lead to supply sufficient electrical power to the external device when the first and second batteries individually are unable to supply sufficient electrical power to the external device.

7. A process of selectively connecting plural storage batteries to a power output lead supplying electrical power to an external device comprising;

A. sensing the ability of a first storage battery to supply electrical power to the external device;

B. sensing the ability of a second storage battery to supply electrical power to the external device;

C. selectively switching the first and second storage batteries into connection with the power output lead to supply sufficient electrical power to the external device.

* * * * *